United States Patent
Haag

[15] 3,688,561
[45] Sept. 5, 1972

[54] WHEEL BALANCING APPARATUS

[72] Inventor: Adolf Haag, Kilchberg, Switzerland

[73] Assignee: Haag Ag., Zurich, Switzerland

[22] Filed: Sept. 3, 1971

[21] Appl. No.: 177,644

[30] Foreign Application Priority Data

Sept. 3, 1970 Switzerland............13204/70
Sept. 3, 1970 Switzerland............13205/70

[52] U.S. Cl....................................73/484, 73/487
[51] Int. Cl..............................................G01m 1/12
[58] Field of Search................73/482, 483, 484, 487

[56] References Cited

UNITED STATES PATENTS 2,589,456   3/1952   Tinkham.....................73/483
3,164,996   1/1965   Carrigan.....................73/483

*Primary Examiner*—James J. Gill
*Attorney*—Robert D. Flynn et al.

[57] ABSTRACT

A support structure which includes a frame has selectively engageable ground contact element which either fix the frame in position or permit rolling over the ground surface for movement; when fixed in position, pivotable rods engage the ground, the rods being length-adjustable so that the frame can be balanced accurately with respect to gravity. A balancing head is rotatably supported on the support structure, for example by a hydrostatic bearing, the balancing head being essentially cone-shaped and having a centering flange to which an upper flange can be removably secured, the upper flange carrying a level gauge to determine the position of the balancing head with respect to gravity. The balancing head is preferably supported over the balancing flange by means of spacer pins which, at the same time, can serve as locating pins for wheel rims to be balanced.

9 Claims, 4 Drawing Figures

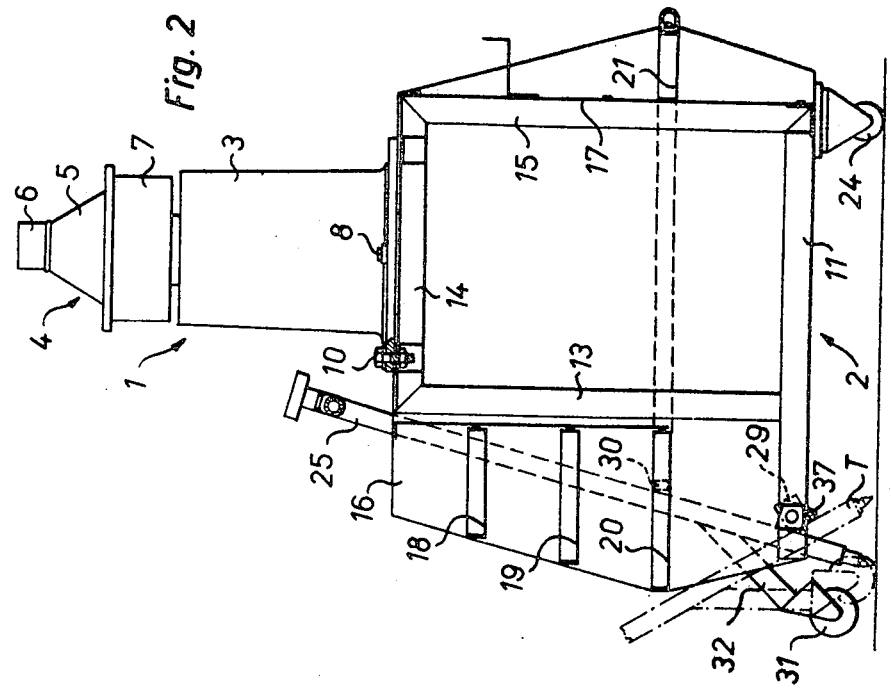

WHEEL BALANCING APPARATUS

The present invention relates to a wheel balancing apparatus and more particularly to a wheel balancing apparatus to balance rims and tires of automotive vehicles, especially passenger cars.

Wheel balancing apparatus must accurately reflect the balance, both dynamically and statically, of wheels placed thereon. To this end, they usually are supplied with a balancing head which is longitudinally movable in a guide tube and supported by means of a hydrostatic bearing. To balance tires and rings of motor vehicles, the tires, with or without the rims are placed in a horizontal plane and centered on a centering head which is supported to be practically free of friction. Balancing weights are then placed on the wheels or on the tires to correct any unbalance which may be present. Such balancing can be done rapidly, particularly when the balancing head is supported on a hydrostatic bearing.

To balance wheels and tires for trucks it is usually sufficient if the balancing apparatus is in an approximately horizontal position. It is not necessary that the balancing apparatus is fixed to ground, or to the garage floor, and it is quite possible to make the apparatus movable by securing wheels, or casters thereto so that the apparatus can be moved to any desired location. Smaller tires, particularly passenger car tires and wheels cannot, however, be balanced with apparatus which is only approximately level. The sensitivity of the apparatus must be greater in order to determine already small unbalance forces. This requires an apparatus which is more sensitive, more accurately adjustable, but yet which should be movable and which should be so arranged that the apparatus can be levelled simply and rapidly.

It is an object of the present invention to provide a wheel balancing apparatus which has the required sensitivity to permit balancing of wheels, rims, and tires of passenger cars, and which is so constructed that the ground support surface may be non-level, without affecting the accuracy or sensitivity apparatus; and which, nevertheless, is movable and can readily be re-adjusted to operate from any desired location.

SUBJECT MATTER OF THE PRESENT INVENTION

Briefly, the wheel balancing head as such is fixed to a chassis or frame which is supported on the ground in such a manner that it is either fixed, or movable; the support is by means of three-point contact elements which, when fixed to the ground, engage rods which are length-adjustable with the ground; and which, when movable, can be pivoted to engage wheels with the ground so that the entire apparatus can readily be rolled. Adjusting the length of the support rods permits accurate levelling of the frame. The centering head itself has a centering flange on which an upper flange is removably secured, the upper flange being provided with a level gauge to determine the position of the support body for the head itself.

The invention will be described by way of example with reference to the accompanying drawings, wherein:

FIG. 1 is a front view of the apparatus, partly in section;

FIG. 2 is a schematic side view, partly in section;

Figure 4:
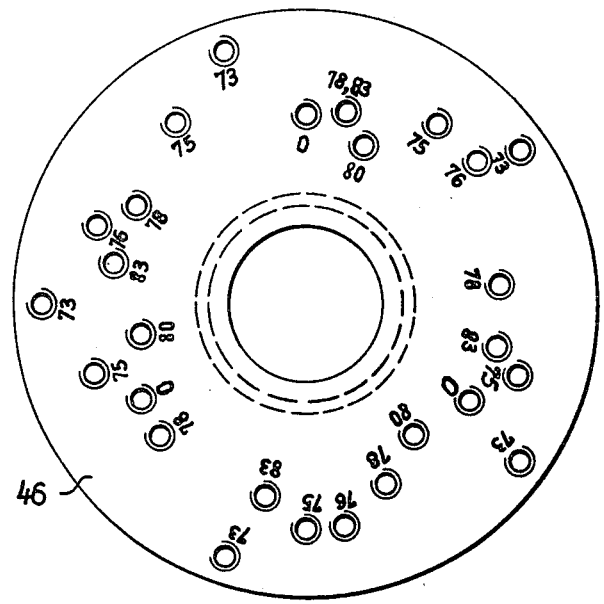

and FIG. 4 is a top view of the centering flange.

The wheel balancing apparatus best seen in FIGS. 1 and 2 has, essentially, two parts. Part 1 is the balancing apparatus itself and part 2 is a support chassis or frame 2. The portion 1 of the apparatus has a support 3 and a balancing head 4. Balancing head 4 itself has a central tube 6 on which a centering cone 5 is longitudinally movably guided. A support body 7 is secured to the tube 6. Support body 7 includes a hydrostatic bearing, not shown and well known in the art. The support body 3 has a level gauge, such as a bubble level 8 arranged thereon, in order to permit accurate determination of the level position of the support 3.

Support 3 is secured to frame 2 by means of screws 10. Frame 2 is formed as a square box, open towards the bottom, assembled from a group of profiled rails 11–15, such as angles, U-channels or the like. Sheet metal side walls 16, 17 close off the sides of the frame. The two parallel side walls 16 extend beyond the edges of the frame to form side supports for shelves 18–21 on which material and tools for balancing wheels and tires can be placed and stored. A fluid pressure line, not shown, is secured to the frame, connecting with the hydrostatic bearing in balancing head 4, and adapted to be connected to a source of fluid pressure.

A single roller or caster 24 is located at the bottom of the frame centrally at one side wall. A pair of support rods 25, 26 are located opposite roller 24, and interconnected by means of a cross brace 27. Support rods 25, 26 are pivotally secured on a shaft 28 by means of brackets 29 and so arranged that they can be moved along side walls 16 to swing between an operating and a transport position, as seen in FIG. 2, in which the visible parts of the support rods are drawn in full line when in operating position. Support rods 25, 26 bear against elastic stops, such as rubber bumpers 30. The support rods additionally each have a roller or caster 31 secured thereto by means of a tube 32, and which, when in operating position, is lifted off the ground level. Thus, for operation, the machine is supported at one point by caster 24 and at two other points by means of rods 25, 26 to be rigidly supported by a three-point triangular support arrangement.

The effective length of rods 25, 26 is adjustable. A shaft 33 is located within the rods which, at least in part, are hollow; shaft 33 is formed with a thread 34 which is screwed into a tapped terminal element 35 secured in the support rods. Upon turning adjustment wheel 36, secured to shaft 35, the terminal end of the support rod, that is shaft 35 is adjustable inwardly, or outwardly to adjust the effective length of the support rod. Thus, by adjusting the effective length of the support rods 25, 26, it is possible to adjust the position of frame 2 accurately and to level the frame, so that the entire apparatus can readily be levelled even on sloping floors, for example on floors tending towards a drain, as indicated on the bubble level 8.

The position of rods 25, 26 which corresponds to transport position is shown in chain-dotted lines at T. In this position, rods 25, 26 together with their cross brace can serve as a moving handle, or bail, to move the entire apparatus about. The transport position of the support rods itself is determined by abutment pins 37 which can be resiliently cushioned.

The apparatus thus readily permits moving about, by swinging the rods 25, 26 into the transport position T. When moved to a new location, the apparatus can be secured in position by flipping the handle formed by rods 25, 26 and cross brace 27, thus lifting the machine to be securely supported at three points. Wheels can be balanced as soon as the level position of the chassis has been determined, that is, when the bubble in gauge 8 is accurately centered. This is the most sensitive position of the balancing head 4.

Figure 3:
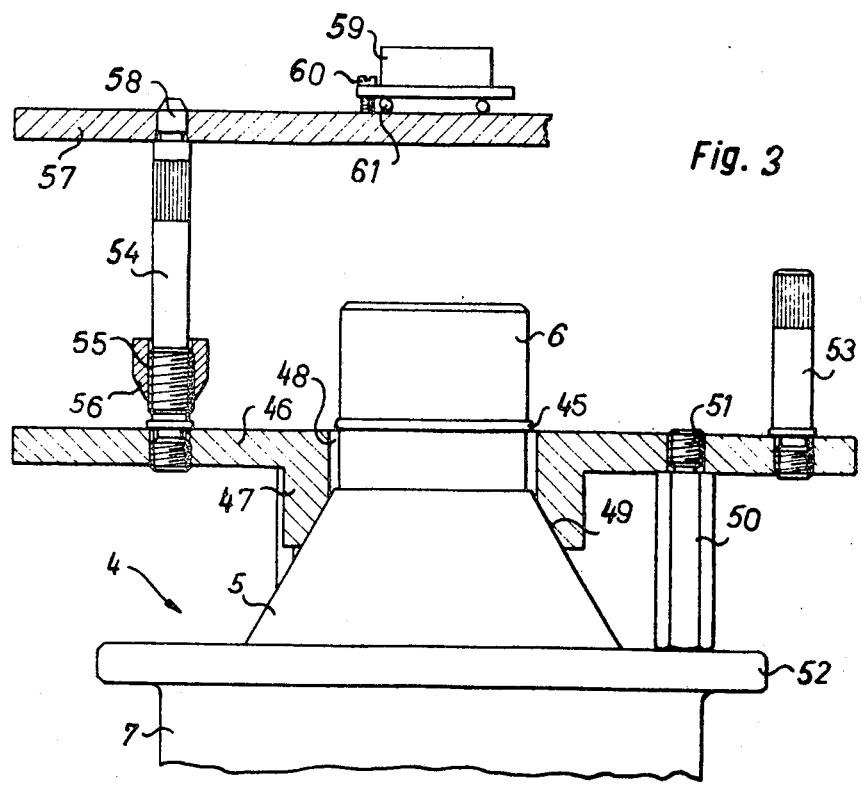
FIG. 3 is a partly sectional side view of the balancing head, to an enlarged scale, to test wheels and rims which may have a small central opening, a large central opening, or no central opening at all.

The centering cone 5 is best seen in FIGS. 3 and 4. It is normally pressed upwardly by an internal spring (not shown), the upper position of the cone on tube 6 being limited by a C-ring 45, slipped into a groove formed in tube 6. Preferably, tube 6 has a bubble gauge located at its top so that the position of the centering head itself can be determined, independently of the position of the chassis 2. The hydrostatic bearing, well known in the art and not especially shown, may have compressed air applied thereto and then provides a practically friction-free bearing which is sensitive to already small unbalance forces, so that support body 7 will be moved from its centered position. If wheels and rims are to be tested which have a wide central opening, then the wheels can be placed directly on support body 7, the rim itself acting as a self-centering element due to the presence of cone 5. The position of cone 5 with respect to the support 7 will be determined by the size of the central opening of the rim. Both the tire and the rim are well below the hydrostatic bearing so that the apparatus with wheel and rim mounted thereon will be in stable balance.

Rims having small central bores, or having no central bores at all, are centered by using centering flange 46. Centering flange 46 has a hub 47 with a bore 48 which is of such size, that centering flange 46 can be slipped over the guide tube 6 and the C-ring 45. Hub 47 has a conical surface 49 which matches the inclination of cone 5. Centering flange 46 further is formed at its bottom with supports 50 which are screwed by means of tapped ends 51 into tapped bores of the centering flange 46 and to bear against the rim 52 of the support body 7, thus being centered exactly on the centering flange and, by adjustment of the threads 51, exactly parallel to the support body 7. The centering flange 46 has a plurality of tapped holes 73–83 formed therein, see FIG. 4, the holes being arranged in groups having radial distances corresponding to the standard distances of attachment holes of standard rims. The rim to be tested is centered on the flange 46 by means of pins 53, fitting into the appropriate holes in the rim. Pins 53 may have any desirable form, but preferably are so shaped that they fit exactly into the bores in the rims to be tested. To provide for ease of assembly, bores of one group and corresponding to a standard size rim have associated therewith numbers which match; those bores, however, which are assigned to supports 50 are unnumbered or have been numbered 0.

In order to improve the centering of some rims, it may be desirable to provide adjustable pins; pin 54 is formed with a thread 55 on which a centering nut 56 is secured, to which rims can be secured for accurate centering about flange 46 and thus head 4.

Some rims have very small central bores or none at all. Rims without central bores are usually formed with a projecting, cup-shaped central portion which, when the wheel is tested, would cover the bubble level (not shown) in the middle of tube 6. Such rims can be tested by means of the parts 46–56. Under some circumstances, the length of supports 50 must be extended; they should not be extended to such an extent, however, that the center of gravity of the elements 46–56 together with the rim and tire to be tested falls above the hydrostatic bearing since, under such conditions, the balance will become unstable.

Rims without central bores cover the level gauge at the end of guide tube 6; the construction does not permit an alternate location of a level gauge for the head 4 itself. In accordance with a feature of the invention, the centering pins 53 are extending (as seen at pin 54) and an upper flange 57 is located at the ends of the pins, secured to be exactly parallel to centering flange 46. Preferably, the upper flange 57 is formed with openings which are similar to the grouped openings of flange 46, except that the bores are smooth and not tapped. The upper end of pin 54 is formed with a shoulder 58, so that the pins will act as spacers while simultaneously accurately centering the upper flange 57 in position.

A bubble level 59 is located in the center of the upper flange 57, secured thereto for example by means of screws 60. The exact position of the bubble level 59 with respect to centering flange 57 can be adjusted by means of screws 60 bearing down on an elastic ring 61. Rims without central bores, or with central bores which do not permit observation of a bubble level at the end of tube 6 can be tested and balanced by observing unbalanced excursions of head 7 on bubble level 59. Level 59 is located above flange 57 and is interconnected with centering flange 46 by means of pins 54 and thus over supports 50 to the support element 7, and thus with the balancing head 4. Thus, the level 50 will give an accurate indication of the exact position of the balancing head at any time.

The present invention has been illustrated particularly with respect to balancing machines for passenger cars; various changes and modifications may be made within the scope of the inventive concept so that tires and rims other than passenger car tires can be balanced.

I claim:

1. Wheel balancing apparatus to balance automotive tires and rims comprising
   a support structure (2) including a frame and selectively engageable ground surface contact means secured to the frame and permitting fixed or rolling contact over a ground surface, engaging the ground surface at three points and supporting the structure on ground level;
   a conical balancing head (4) adapted to have a rim or tire placed thereon and means (3) rotatably supporting said balancing head on the support structure;
   means (33, 34, 35) adjusting the contact means to permit levelling of the support structure with respect to gravity;
   a centering flange (46) located on the conical balancing head and centered with respect thereto;
   an upper flange (57) removably supported above the centering flange (46) and centered with respect to the conical balancing head;

and a level gauge (59) mounted on the upper flange to determine the position of the balancing head with respect to gravity.

2. Apparatus according to claim 1, wherein the contact means comprises at least one support rod having a pair of ground engageable end portions, at least one end portion being length-adjustable, said support rod being movable between a ground surface engaging, operating position and a ground surface released, transport position;

a wheel (31) secured to the other end portion of the support rod, the wheel engaging the ground surface when the support rod is moved into transport position, and a length-adjustable portion engaging the ground when the support rod is moved into operating position.

3. Apparatus according to claim 2, wherein a pair of support rods (25, 26) are provided, at least one of which is length-adjustable, one each support rod being located at a side of the apparatus;

a cross member (27) interconnecting the support rods, the support rods being pivotally secured to the frame;

and a wheel (31), each, secured to the support rods.

4. Apparatus according to claim 1, including a level gauge (8) secured to the frame to permit checking the balance of the frame with respect to gravity.

5. Apparatus according to claim 1, wherein the frame is a box-like structure having sidewalls (16);

and shelf means (18-21) connected to the sidewalls to permit placement of balancing materials on the apparatus.

6. Apparatus according to claim 1, wherein the conical head has a radially extending flange (52);

and a centering flange (46) is provided with support means (50) bearing against the extending flange, the centering flange on the conical head being below its center of gravity.

7. Apparatus according to claim 1, wherein the centering flange (46) is formed with a plurality of openings (73-83) arranged in groups, the openings of different groups having different radial distances from the center of the centering flange and corresponding to different wheel rim bolt openings;

and locating means (53, 54, 56) for the openings of the centering flange and adapted to secure a rim on the centering flange by selective engagement of the openings of selected groups.

8. Apparatus according to claim 7, wherein the upper flange (57) is formed with openings corresponding at least to some of the location of the openings of the centering flange;

and spacer means (54, 58) interconnecting the upper flange and the centering flange and locating the upper flange centered and parallel with respect to the centering flange.

9. Apparatus according to claim 7, wherein the locating means are formed as spacer pins to secure the upper flange in position and locate the upper flange centered and parallel with respect to the centering flange.

* * * * *